Sept. 14, 1926.
A. B. WELLS
1,599,855
OPHTHALMIC LENS
Original Filed Dec. 3, 1924   2 Sheets-Sheet 1
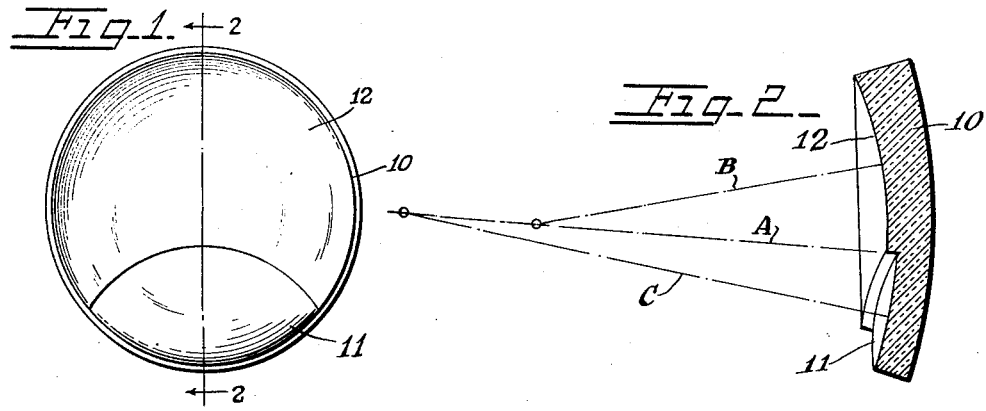
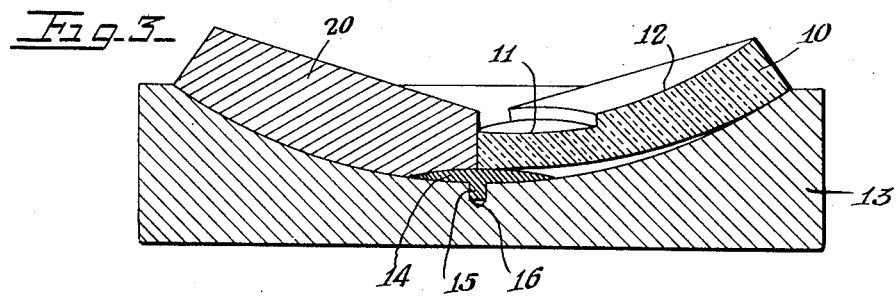
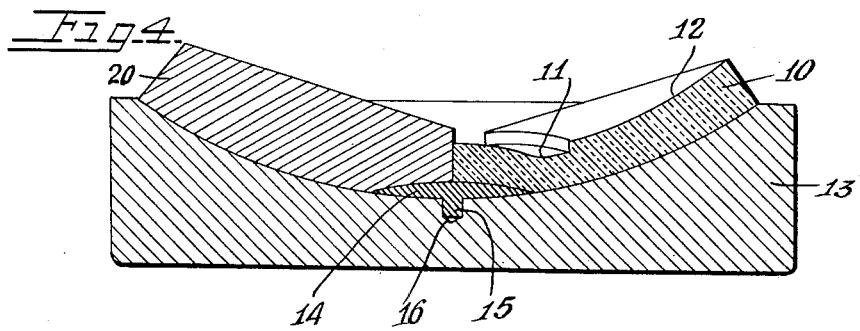
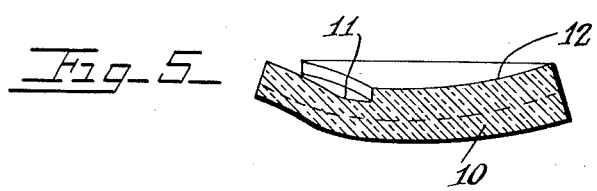
Inventor
Albert B. Wells.
Harry H. Styll Sept. 14, 1926.          A. B. WELLS          1,599,855
OPHTHALMIC LENS
Original Filed Dec. 3, 1924    2 Sheets-Sheet 2
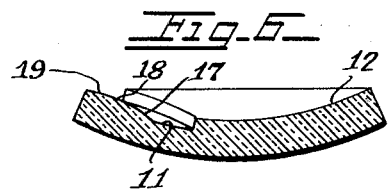
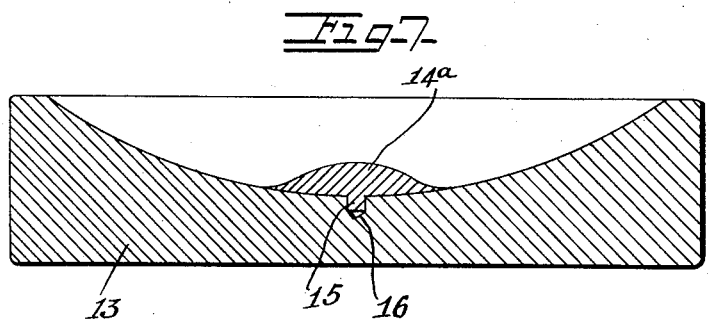
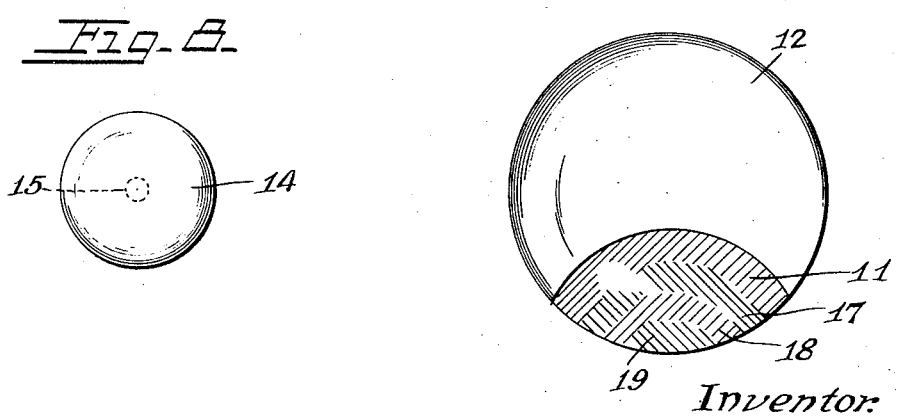
Inventor:
Albert B. Wells.
Harry H. Styll Patented Sept. 14, 1926.

1,599,855

UNITED STATES PATENT OFFICE.

ALBERT B. WELLS, OF SOUTHBRIDGE, MASSACHUSETTS, ASSIGNOR TO AMERICAN OPTICAL COMPANY, OF SOUTHBRIDGE MASSACHUSETTS, A VOLUNTARY ASSOCIATION OF MASSACHUSETTS.

OPHTHALMIC LENS.

Original application filed December 3, 1924, Serial No. 753,665. Divided and this application filed April 28, 1926. Serial No. 105,473.

This invention relates to new and useful improvements in ophthalmic lenses, and has particular reference to an improved bifocal lens and a process for the production of the same.

This is a division of my application Serial Number 753,665, filed December 3, 1924.

A most important object of my invention is to produce a bifocal lens having a reading portion of varying power.

Another important object of my invention is to produce a bifocal lens having a reading portion, the power of which increases gradually from its line of juncture with the distance portion.

A further object of my invention is to provide a process by which additional power curves may be applied to the reading portion of a partially finished bifocal blank.

A still further object of my invention is to provide a process by which a blank may be ground on one side to form a distance portion and a reading portion, and by which curves adding additional power to the reading portion may be formed thereon without damaging the finished side of the lens.

A still further object of my invention is to provide a one piece bifocal lens having a reading portion formed of gradually increasing power from its line of juncture outward and to construct this lens such that there will be no jump between the reading portion and the distance portion.

Other objects and advantages of my invention will become apparent during the course of the following description taken in connection with the accompanying drawing.

In the drawing, wherein I have illustrated the preferred embodiment of my invention, and wherein like numerals are used to designate corresponding parts throughout all views of the same:—

Figure 1 is a front elevation of a blank employed in my process;

Figure 2 is a sectional view of the same taken on line 2—2 of Figure 1;

Figure 3 is a transverse section taken through a mold in which is positioned a lens about to be molded;

Figure 4 is a similar view after the lens has been heated to plastic state;

Figure 5 is a sectional view of a lens blank as it is removed from the mold;

Figure 6 is a similar view showing the same ground to the finished lens;

Figure 7 is a transverse section through a mold showing a modified form of the curved button employed in my process;

Figure 8 is a top plan view of the button, and

Figure 9 is a front elevation of a finished lens on which is graphically represented a variation in power of the reading portion.

The well known manner of making bifocal lenses at the present time is by providing the main lens blank with a recess or depression and then fusing a button in this recess or depression, and subsequently grinding the blank thus formed to the proper curvature. In constructing lenses in this manner the power of the reading portion is always the same at the top as at the bottom and it is, therefore, one of the most important objects of my invention to produce a lens having a variable reading portion. In the past various attempts have been made to produce bifocal lenses having variable reading portions, chief amongst which has been the attempt to provide a lens blank with a plurality of concentric depressions, and then fusing in these depressions a segment of a different refractive power than the original blank. While this process has produced a multifocal lens, it has not been commercially practical, in that the finished lens has had prismatic effects which were both unsatisfactory and dangerous.

Another process has contemplated the grinding of these series of various power curves on the reading portion of a bifocal lens, but this too has been unsuccessful in that there has always been too much of a jump between each of the different curves, whereby a person on looking through the lens is troubled by the jumping from one section to another.

My invention overcomes these difficulties in that I grind one surface of my lens to produce a distance portion and a reading portion and then mold onto the reading portion by indenting the opposite side of the blank a series of curves of additional power.

In carrying out my invention I employ a blank 10; said blank may be of the cliff type, as shown in Figure 1, or of the merged type. For the purpose of illustration, however, in the setting forth of my invention I employ a cliff type lens and grind the concave surface of this blank with a distance portion 12 and a reading portion 11. In grinding this distance portion and reading portion, I prefer, although I do not limit myself entirely to this means, to grind the same monocentric, as clearly shown in Figure 2 of the drawing, wherein the numeral A designates the central axis on which the pivot of the axis B falls for grinding the distance portion, and on which likewise the axis C falls for grinding the reading portion. In grinding my lens monocentric such as this, it is obvious that I produce a substantially jumpless bifocal lens. After the one surface of the blank has been ground and polished the same is placed in a mold 13, whereby the desired additional power curves are produced on the reading portion. In order to produce these curves I provide a curved block 14 having a pin 15 formed on the under face thereof and adapted to be seated within a recess 16 in a mold, whereby it is retained in its proper set position.

In practical use it is obvious that I may use any shape of block 14 that I desire, as for example in Figure 7, I have shown a block 14A, wherein the curve is substantially a gradual one, and by which a similar gradual curve would be applied to the reading portion. It is obvious that these blocks may take any one of a desired number of forms, each form representing some definite power curve or group of power curves, which I desire to add to the reading portion of my lens.

As illustrated in Figure 3 of the drawing, a lens blank 10 finished on the concave surface as at 11 and 12 has been positioned within the mold 13 prior to the additional shaping of the reading portion. It will be seen that the point on the unfinished side of my blank, directly opposite the reading portion, rests upon and is supported by the block 14. In order to retain the lens in its proper position and prevent any lateral movement on the part of the same, I provide a filler block 20, arranged upon the opposite side of the mold and preventing the lens from sliding or from losing its general form, and thus spoiling the finished surface of the same.

In Figure 4, I have shown the lens positioned in the mold, and have shown the shape that it takes when it is heated to plasticity. From this view it will be seen that the reading portion 11 is forced upwardly to take the shape of the block 14 placed in the base of the mold. In the forming of a lens with my improved process the various curving will be produced as follows: For example, I take a blank having a minus 6 distance portion, with a minus 4.50 reading portion, add a plus 1.50 to the reading portion through the curved block, and then grind the convex surface of the lens to a plus 7. It will be apparent that by adding the plus 1.50 to the reading portion it will give me a minus 3. and then by grinding the opposite face to a plus 7. the reading portion will be plus 4., while the distance portion will be plus 1. It will be apparent that various additions may be applied to the reading portion to vary the power of the lens, with regard to the reading portion, and that the unfinished face of the lens may be ground as desired in accordance with the powers to be obtained in the reading portion and in the distance portion.

In Figure 5 of the drawing I have shown the lens blank as it is removed from the mold after having had formed on the reading portion the additional curves. The dotted line in Figure 5 represents diagrammatically the point to which the lens may be finished on the convex side, it being understood, however, that said line is merely representative, and that in real practice the lens may be finished on this side to any power desired.

In Figure 6 is shown the lens after the convex side has been ground and finished to the desired power, and shows more or less diagrammatically the additions to the reading portion which I have exaggerated to illustrate more clearly, and which I have designated by the numerals 17, 18 and 19. Although I have shown these additions to take the form of individual curves, it is to be understood that it is my intention to provide the block 14 with a substantially gradually increasing curve, such that the finished lens will be provided, not with a series of curves of different powers, but with a curve gradually increasing from its line of juncture with the reading portion to its outer edge.

In Figure 9, I have shown a front elevation of a lens finished in accordance with my process, and wherein is illustrated a gradual increase of power from the line of juncture to the reading portion to its outer edge. It can be seen that a lens constructed in this manner is particularly advantageous when used for reading, as a person's natural tendency in holding a paper or book before the eyes, is to hold the same with a certain degree of slant, the upper portion of the paper or book being usually a further distance from the eye than that portion toward the bottom. When reading, a person's eyes will travel downwardly over the object, bringing the letters closer to the eye as they travel downwardly, so that the variable curves of the reading portion will be used to great advantage in retaining the same line of vision, thereby retaining the same strength or power to the lens with regard to the various distances of the objects upon which the eyes are focused.

Although I have shown and described my invention as applied to a cliff type lens, it is to be understood that the same process may be applied to a lens of the merged type. In addition to this I also include within the scope and purpose of my invention the production of a fused bifocal lens following the same process. In applying this process to a bifocal lens of the fused type my process would find its application in grinding the segment receiving portion of the blank monocentric with the distance portion, forming additional power curves on the segment receiving portion by indenting the opposite surface of the blank and then fusing the segment of a different refractive glass in the segment receiving portion that has been increased in power by my process. In this way I am able to combine with the advantage of a variable reading portion, the equal advantage of a segment of the different refractive power, obtaining all of the advantages of a fused bifocal, together with the obvious advantages of a variable reading portion.

From the foregoing description it will be seen that I have produced a lens having a substantially jumpless joinder between the reading portion and the distance portion, and have further provided the reading portion with a gradual increase in power from its juncture outward. It will be apparent that the grinding and polishing of the unfinished surface of the lens will eliminate all circular zone effects produced by the mold block 14 so that when the finished lens is ready for the market all effects of the molding process will be entirely removed.

While I have shown and described but one form of my invention, which I prefer to present as the preferred embodiment of the same, it is to be understood that I reserve the right to make certain departures therefrom, insofar as I remain within the spirit of my invention and the scope of the appended claims.

Having described my invention, I claim:—

1. The process of producing a multifocal lens, consisting in grinding and polishing distance and reading portions on one surface of a blank, heating the blank to plasticity, applying additional power curves to a portion of the reading portion, by forcing upwardly from the unfinished surface of the plastic blank a portion opposite part of the reading portion and having the curve desired, and grinding the unfinished surface of the lens to the power desired.

2. The process of producing a variable reading portion in a lens of the bifocal type, consisting in grinding and polishing to definite powers reading and distance portions on one surface of a blank, placing the blank in a mold, the unfinished side of the blank adjacent the floor of the mold the same being provided with an upstanding button of some definite curve, heating the blank to plasticity to form on the reading segment of the finished surface a curve corresponding to the curve of the button, and grinding the unfinished surface of the lens to the power desired.

3. The process of producing a variable reading portion on a lens of the bifocal type, consisting in grinding and polishing to definite powers reading and distance portions on one surface of a blank, heating the blank to plasticity, applying additional power curves to a part of the reading portion, by forcing a button of the desired curvatures into the unfinished surface of the blank at a point opposite the part of the reading portion to be made stronger, and grinding and polishing the unfinished surface to the power desired.

4. The process of producing a variable reading portion on a lens of the bifocal type, consisting in grinding and polishing to definite powers, reading and distance portions on one surface of a blank, heating the blank to plasticity, increasing the power of a part of the reading portion by indenting the unfinished surface of the blank at a point opposite the part of the reading portion to be increased, and grinding the unfinished surface to the power desired.

5. The process of producing a multifocal lens blank, consisting in grinding and polishing distance and reading portions on one surface of a blank, heating the blank to plasticity, and applying additional power curves to a portion of the reading portion by forcing upwardly from the unfinished surface of the plastic blank a portion opposite part of the reading portion, and having the curve desired.

ALBERT B. WELLS.